US008860836B2

(12) United States Patent
Thabuis et al.

(10) Patent No.: US 8,860,836 B2
(45) Date of Patent: Oct. 14, 2014

(54) DEVICE AND METHOD FOR COMPRESSING AN IMAGE FOR AN IMAGE SENSOR

(75) Inventors: Tristan Thabuis, Amancy (FR); Patrick Villard, La Tronche (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 507 days.

(21) Appl. No.: 13/266,150

(22) PCT Filed: May 4, 2010

(86) PCT No.: PCT/FR2010/050852
§ 371 (c)(1),
(2), (4) Date: Oct. 25, 2011

(87) PCT Pub. No.: WO2010/128245
PCT Pub. Date: Nov. 11, 2010

(65) Prior Publication Data
US 2012/0092518 A1  Apr. 19, 2012

(30) Foreign Application Priority Data

May 7, 2009 (FR) ...................................... 09 53060

(51) Int. Cl.
*H04N 5/228* (2006.01)
*H04N 19/63* (2014.01)
*H04N 5/378* (2011.01)
*H04N 5/238* (2006.01)

(52) U.S. Cl.
CPC ........... *H04N 7/26393* (2013.01); *H04N 5/378* (2013.01)

USPC ......... 348/222.1; 348/235; 348/364; 382/232

(58) Field of Classification Search
USPC ........ 348/222.1, 235, 349, 364, 573, E05.031
See application file for complete search history.

(56) References Cited

U.S. PATENT DOCUMENTS

| 5,434,623 A * | 7/1995 | Coleman et al. ......... 375/240.04 |
| 2008/0008395 A1 * | 1/2008 | Liu .............................. 382/244 |
| 2011/0096621 A1 * | 4/2011 | Mansour .......................... 367/7 |

OTHER PUBLICATIONS

Shoji, K., et al., "A CMOS Image Sensor with Analog Two-Dimensional DCT-Based Compression Circuits for One-Chip Cameras," IEEE Journal of Solid-State Circuits, vol. 32, No. 12, pp. 2030-2041, (Dec. 1, 1997) XP011060624.
Olyaei, A., et al., "Mixed-Signal CMOS Wavelet Compression Imager Architecture," IEEE, pp. 1267-1270, (Aug. 7, 2005) XP010895375.
International Search Report Issued Jul. 30, 2010 in PCT/FR10/050852 Filed May 4, 2010.

* cited by examiner

*Primary Examiner* — Hung Lam
(74) *Attorney, Agent, or Firm* — Oblon, Spivak, McClelland, Maier & Neustadt, L.L.P.

(57) ABSTRACT

A device for compressing an image for an image sensor, including a module for analog decorrelation of an image for providing low-frequency coefficients and high-frequency coefficients from the image, an analog-digital coefficient converter, and a module for a differentiated analog amplification of the low-frequency coefficients and of the high-frequency coefficients, provided by the analog decorrelation module to provide modified coefficients to the converter.

11 Claims, 2 Drawing Sheets

DEVICE AND METHOD FOR COMPRESSING AN IMAGE FOR AN IMAGE SENSOR

Figure 1:
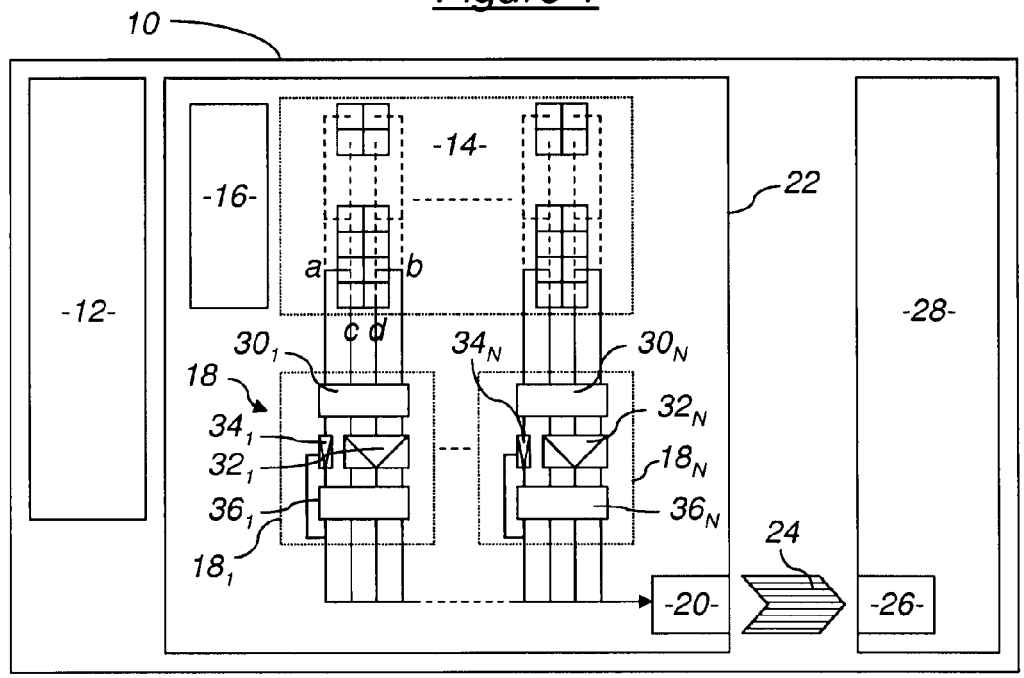

This invention relates to a device and a method for compressing an image for an image sensor, in particular for a digital output image sensor. It also relates to an image sensor comprising such a compression device.

In certain applications such as cooled thermal infrared imaging or high dynamic range imaging, optimisation of both image quality and consumption is a first rate concern.

For example, in order to obtain a maximum signal to noise ratio with a photonic sensor for infrared detection, this sensor must operate in an environment with a low, constant temperature of generally around 77 K. Therefore, this type of sensor must comprise low consumption reading and processing circuits so as to limit the amount of heat dissipated and the cost of the cooling system.

In a digital output photonic sensor, three types of noise can disturb the signal provided: photonic noise, electronic noise and quantisation noise. Photonic noise is inevitable and increases with the magnitude of the radiation detected. Electronic noise is independent from the magnitude of the radiation detected and depends on the design of the sensor's electronic circuits. Finally, quantisation noise is independent from the magnitude of the radiation detected, however depends on the resolution of the analogue/digital converter used within the sensor. By looking to minimise electronic noise and quantisation noise so that photonic noise becomes the limiting factor over the whole desired dynamic range of the radiation to be detected and thus to guarantee a maximum signal to noise ratio over the entire usable detection range, an analogue/digital converter is generally used with very high resolution and consumption. Furthermore, in this event, the transmission of digital output data from the converter becomes very expensive, in particular for a large-scale photonic sensor with a high frame rate.

In order to reduce consumption in the digital output image sensors while preserving an acceptable image quality, a first solution consists in multiplying the number of analogue/digital converters within the same sensor. This solution is based on the verified principle that the increase in the power consumed by an analogue/digital conversion circuit with its operating frequency is accelerated when the latter becomes very high. Therefore, N converters operating at a frequency F consume less energy than a single converter operating at a frequency N×F for an equivalent resolution. For an image sensor comprising an array of photosensitive pixels, a structure with a single converter at the end of the array can be replaced with a structure comprising a plurality of converters at the bases of the array columns, or even with a structure comprising a plurality of converters integrated into the array, each processing a block of pixels of a predetermined size. Each converter, for example multiple slope converters, can also provide for the parallel processing of most significant bits and least significant bits to further reduce consumption.

A second solution is based on the principle that, as photonic noise increases with the magnitude of the radiation detected, the analogue/digital converter can be designed to quantise the signals provided by the pixels according to a variable step size, in particular a small step size with low magnitudes and increasing with the magnitude of the incident flux, without involving visible losses as long as photonic noise remains dominant over the entire usable range. A device implementing this solution is described, for example in the patent published under number U.S. Pat. No. 7,148,831. Therefore, the signal to noise ratio remains optimal, however the quantity of digital output data to be transmitted from the converter is reduced, thus reducing consumption.

A third solution consists in decorrelating the image captured by the pixel array so as to reduce its entropy. In this case, the aim is also to reduce the quantity of digital output data being transmitted from the converter. Moreover, performing an analogue decorrelation operation before the analogue/digital conversion also reduces consumption when compared to performing a digital decorrelation operation after the analogue/digital conversion.

It should be noted that the three solutions described hereinabove are not incompatible with each other and can be implemented in a combined manner within the same device. In particular, analogue decorrelation can be provided for upstream of the analogue/digital conversion process, including within a structure comprising a plurality of converters at the bases of the array columns or a structure comprising a plurality of converters integrated into the array, each processing a block of pixels of a predetermined size. Indeed, a certain number of known analogue decorrelation modules process array pixels in blocks of predetermined sizes, in particular blocks of 2×2, 4×4 or 8×8 pixels.

Furthermore, when analogue decorrelation is combined with analogue/digital conversion, lossy compression can be considered by not converting the coefficients generated by the decorrelation process when the latter are lower than a predetermined limit and/or by adapting the quantisation step of the analogue/digital conversion to each type of coefficient. The consumption savings are therefore higher.

The invention therefore relates more particularly to a device for compressing an image for an image sensor, comprising a module for the analogue decorrelation of an image for providing low-frequency coefficients and high-frequency coefficients from said image, and an analogue/digital coefficient converter.

Such a device is described, for example in the document entitled "Mixed-Signal CMOS Wavelet Compression Imager Architecture" by A. Olyaei et al, 48th Midwest Symposium on Circuits and Systems, 2005, vol. 2, pp. 1267-1270, 7-10 Aug. 2005. In this device, the array is divided into blocks of $2^L \times 2^L$ pixels, on which level L two-dimensional Haar wavelet transforms are applied. However, the errors introduced by the processing operation cause an increase in the quantisation noise over the whole usable signal dynamic range. A detrimental loss is particularly sensitive in the image zones with low incident flux.

A compression device overcoming the aforementioned problems and restrictions and/or boasting improvements in terms of quality at equivalent consumption rates or improvements in terms of consumption at equivalent quality can therefore be desired.

The invention therefore relates to a device for compressing an image for an image sensor, comprising a module for the analogue decorrelation of an image for providing low-frequency coefficients and high-frequency coefficients from said image, and an analogue/digital coefficient converter, also comprising a module for a differentiated analogue amplification of the low-frequency coefficients, on the one hand, and of the high-frequency coefficients, on the other hand, provided by the analogue decorrelation module in order to provide modified coefficients to the converter.

Therefore, by distinguishing two types of coefficients originating from the decorrelation process, the low-frequency coefficients on the one hand and the high-frequency coefficients on the other hand, in order to perform a differentiated amplification processing operation on each of these types of coefficients before subjecting the coefficients to the analogue/ digital converter, we can benefit from an attribute according to which the low-frequency coefficients generally do not have the same dynamic range as the high-frequency coefficients. This leads to the possibility of optimising the processing operation performed by the converter for improved quality at an equivalent consumption rate or for improved consumption at equivalent quality.

Optionally, the analogue amplification module comprises first amplification means designed to apply a first predetermined fixed gain to the high-frequency coefficients and second amplification means designed to apply a second variable gain to the low-frequency coefficients.

Also optionally, the second amplification means are designed to determine, for each low-frequency coefficient to be amplified, the value of the second variable gain according to an a priori estimation of the magnitude of this low-frequency coefficient.

Also optionally, the second amplification means are designed to determine, for each low-frequency coefficient to be amplified, the value of the second variable gain according to at least one numerical value, originating from the analogue/digital converter, of at least one low-frequency coefficient previously amplified.

Also optionally, the image being comprised from separate blocks of pixels and the analogue decorrelation module being designed to transform each block by decomposition into a predetermined two-dimensional base of discrete functions, the set constituted from the low-frequency coefficients comprises the continuous component coefficient of each block and the set constituted from the high-frequency coefficients comprises the other coefficients generated by the decorrelation module.

Also optionally, the image is an array of photosensitive pixels comprised from blocks of 2×2 pixels and the transform is a two-dimensional Haar transform at a single level performed by switched capacitance assemblies positioned at the bases of the columns of this pixel array.

The invention also relates to an image sensor comprising an array of photosensitive pixels capable of capturing an image and a device for compressing this image as previously defined.

The invention also relates to a compression method for an image sensor, comprising a step involving the analogue decorrelation of an image captured for generating low-frequency coefficients and high-frequency coefficients from said image, and a step involving the analogue/digital conversion of coefficients, also comprising a step involving a differentiated analogue amplification of the low-frequency coefficients, on the one hand, and of the high-frequency coefficients, on the other hand, to provide modified coefficients in the analogue/digital conversion step.

Optionally, for each high-frequency coefficient, a first predetermined fixed gain is applied and for each low-frequency coefficient, a second variable gain is applied, the value of which is determined in the following manner:
 if the numerical value, originating from the analogue/digital converter, of a predetermined low-frequency coefficient previously amplified is higher than a first value, the value of the second variable gain is fixed at the maximum between a predetermined lower limit value and half of the value of the second variable gain applied to said low-frequency coefficient previously amplified,
 if the numerical value, originating from the analogue/digital converter, of the low-frequency coefficient previously amplified is lower than a second value lower than the first value, the value of the second variable gain is fixed at the minimum between a predetermined upper limit value and double the value of the second variable gain applied to said low-frequency coefficient previously amplified,
 otherwise, the value of the second variable gain is fixed at the value of the second variable gain applied to said low-frequency coefficient previously amplified.

Also optionally, the first fixed gain is equal to 4 and the value of the second variable gain applied to each low-frequency coefficient is determined in the following manner:
 if the first two most significant bits of the binary value, originating from the analogue/digital converter, of a predetermined low-frequency coefficient previously amplified are equal to 1, the value of the second variable gain is fixed at the maximum between the value 1 and half of the value of the second variable gain applied to said low-frequency coefficient previously amplified,
 if the first two most significant bits of the binary value, originating from the analogue/digital converter, of the low-frequency coefficient previously amplified are equal to 0, the value of the second variable gain is fixed at the minimum between the value 4 and double the value of the second variable gain applied to said low-frequency coefficient previously amplified,
 otherwise, the value of the second variable gain is fixed at the value of the second variable gain applied to said low-frequency coefficient previously amplified.

Figure 2:
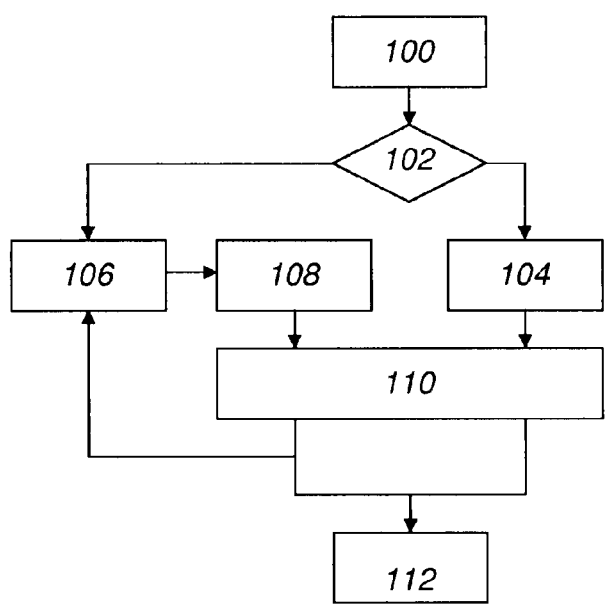
Figure 3:
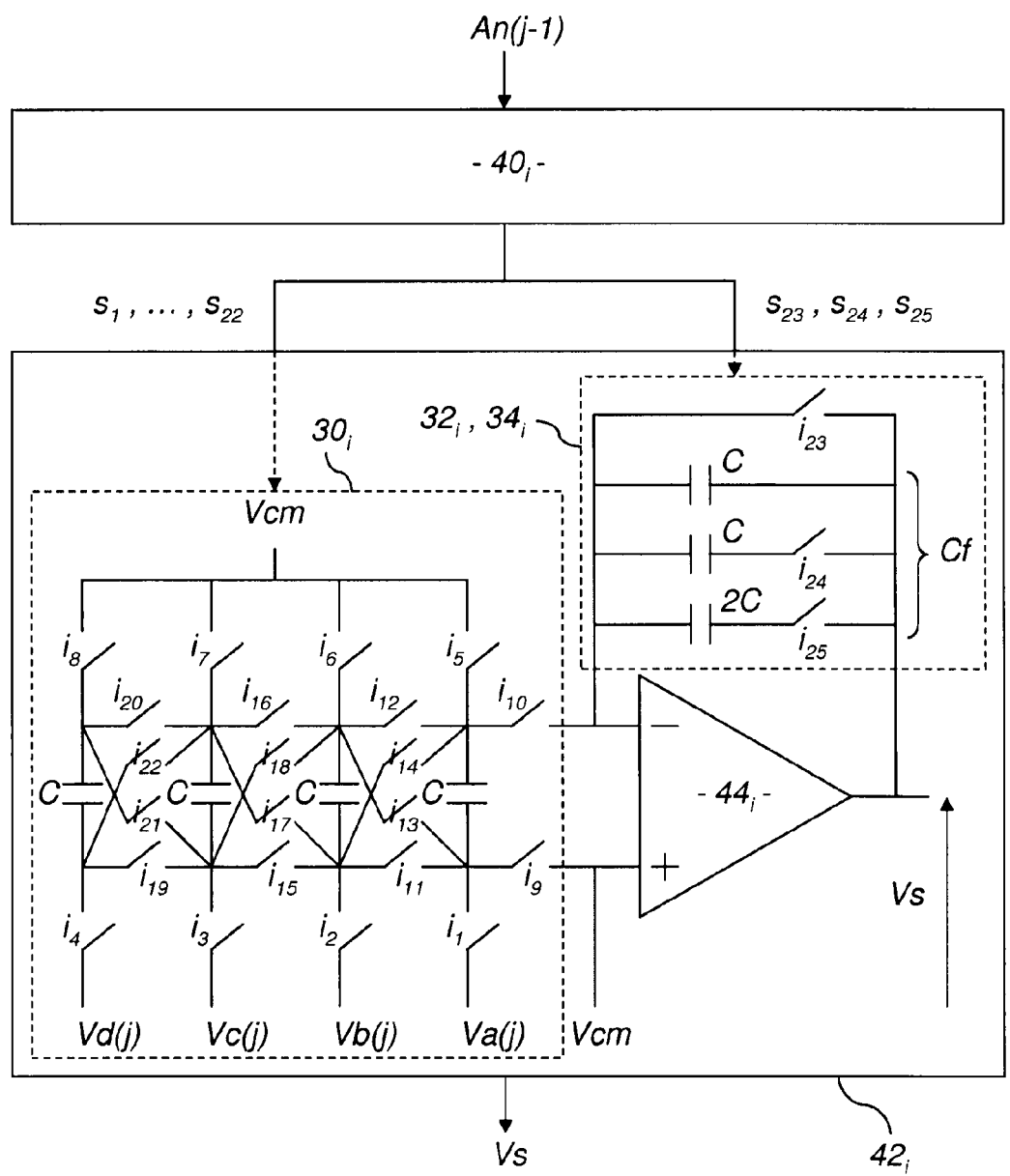

The invention will be better understood after reading the following description, which is provided for purposes of illustration only and with reference to the accompanying figures, wherein:

FIG. 1 schematically represents the general structure of an image sensor according to one embodiment of the invention, FIG. 2 illustrates the successive steps involved in a compression method according to one embodiment of the invention, and FIG. 3 schematically represents the general structure of one possible electronic implementation of an analogue compression and amplification assembly of the image sensor in FIG. 1.

The image sensor 10 schematically represented in FIG. 1, for example a sensor made from CMOS technology, comprises an optical unit 12 and an array 14 of sensitive elements, photodiodes which, associated with electric reading means not represented, form the pixels of an image to be detected.

The pixel array 14 is associated with a sequencing device 16, which defines the sequential activation of the pixels and with a compression device 18 which is in particular capable of performing an analogue decorrelation then an analogue/digital conversion of the signals provided by the pixels of the array 14. Finally, the image sensor 10 provides a bitmap pixel image. The pixel array 14, the sequencing device 16 and the compression device 18 form, with an interface 20 for transmitting the acquired digital images, an electronic circuit 22 generally known as the "imager circuit" or "focal plane" of the image sensor 10.

Moreover, the interface 20 of the imager circuit 22 is generally connected via a physical electronic link 24 to the interface 26 for receiving digital images of a graphics coprocessor circuit 28, which enables quality improvement algorithms to be implemented for the digital images acquired.

The sequencing device 16 defines, in a more precise example, the sequential reading of the pixel values of an image, in electronic shutter mode row by row or in mechanical shutter mode of the full pixel array from the first row to the last row of the bitmap. The pixel values read are then processed by the compression device 18 by advantageously applying a decorrelation by blocks process, such as a DCT, wavelet transform or other process.

In order to adapt the decorrelation process to the row by row sequential reading mode, the image is subdivided into separate blocks. The horizontal direction of the image and blocks composing this image is defined as being that of the rows of the image in the sequential reading mode adopted row by row. Therefore, the vertical direction of the image and blocks composing this image is defined as being that of the image columns.

In the specific but non restrictive example illustrated in FIG. 1, the blocks are square and each constituted from four neighbouring pixels, horizontally over two rows and vertically over two columns, so that the compression device 18 is distributed at the bases of the columns of the pixel array 14 at the rate of one compression module $18_i$ every two columns. If the even number of columns of the array 14 is noted as 2N, the compression device 18 therefore comprises N independent compression modules $18_1, \ldots, 18_N$.

The first compression module $18_1$ processes the first two columns of the array 14. It comprises an analogue decorrelation module $30_1$ for the pixel blocks of the first two columns. This module performs for example a single-level Haar wavelet transform, by which the four pixels a, b, c and d of any block whatsoever are transformed into four coefficients A, B, C and D according to the following equations:

$A = a+b+c+d,$ $B = a+b-c-d,$ $C = a-b+c-d,$ $D = a-b-c+d.$

In a block, the coefficient A produces the average value of the four pixels a, b, c and d and represents the continuous component of the Haar transform at a single level of this block. Taking into account the general properties of the images, which are essentially constituted from different homogeneous zones, each separated from each other by local contours, this continuous component is also a parameter with high entropy, i.e. with a high dynamic range.

Coefficients B, C and D on the other hand represent horizontal, vertical or diagonal transitions within a block. Taking into account the same general properties of the images, the difference between the values of neighbouring pixels is, in most cases, relatively low making these coefficients low-value and low-entropy coefficients.

It can therefore be considered that, for each block of pixels, the coefficient A is a low-frequency coefficient with high entropy generated by the decorrelation module whereas coefficients B, C and D are high-frequency coefficients with low entropy.

The first compression module $18_1$ also comprises an analogue amplification module for the decorrelation coefficients provided by the decorrelation module $30_1$. More precisely, this analogue amplification module comprises a first high-frequency coefficient amplifier $32_1$ (coefficients B, C and D being provided by the decorrelation module for all blocks of the first two columns) and a second low-frequency coefficient amplifier $34_1$ (coefficients A being provided by the decorrelation module for all blocks of the first two columns). The first amplifier $32_1$ is designed to apply a first amplification gain G1 based on criteria different from those on which the second amplifier $34_1$ is based, the latter being designed to apply a second amplification gain G2. Indeed, according to the invention, the analogue amplification module takes into account the difference in statistical properties of both the low-frequency coefficients and the high-frequency coefficients to perform a differentiated amplification operation for the low-frequency and high-frequency coefficients.

Statistically, for a given dynamic range of the pixels of an image, taking into account the aforementioned general properties of the images, the coefficients A reproduce this dynamic range, however it is highly probable that the value of the coefficient A of a block is close to the value of the coefficient A of a neighbouring block. Therefore, one criteria for applying an amplification gain to the coefficients A can advantageously be to make it variable and vary according to an a priori estimation of these coefficients, in particular according to already known numerical values for the coefficients A of neighbouring blocks. One possible functioning of the second amplifier $34_1$ in this sense will be provided in detail with reference to FIG. 2.

However, statistically, for a given dynamic range of the pixels of an image, taking into account the aforementioned general properties of the images, the coefficients B, C and D do not reproduce this dynamic range. Moreover, it is often observed that the absolute value of these coefficients rarely exceeds one quarter of the maximum value capable of being taken by a pixel. Furthermore, when the value of one of these coefficients exceeds one quarter of this maximum value, this is often an artefact which advantageously should not be taken into account. However, it is difficult to predict the value of one of these coefficients according to the value of the corresponding coefficients of neighbouring blocks. Therefore, one criteria for applying an amplification gain to coefficients B, C and D can advantageously be to make it fixed and capable of spreading these coefficients over the whole dynamic range of the pixels, i.e. in particular equal to 4.

Finally, the first compression module $18_1$ comprises an analogue/digital converter $36_1$ which receives the coefficients modified by the amplifiers $32_1$ and $34_1$ as input data. In one simple embodiment, such as that shown in FIG. 1, the quantisation step of this converter can be constant over the whole usable dynamic range of the pixels. However, as previously indicated, the quantisation step of the converter can be variable, in particular increasing according to the magnitude of the signal being digitised. It is understood that the aforementioned variable or fixed values of the gains of the two amplifiers $32_1$ and $34_1$ enable the dynamic range of the decorrelation coefficients to be adapted to that for which the analogue/digital converter $36_1$ is a priori optimal.

At the analogue/digital converter $36_1$ output, the digital coefficients are transmitted to the interface 20. In one embodiment of the invention, as illustrated in FIG. 1, the numerical values obtained for the low-frequency coefficients are also at least partially transmitted to the second amplifier $34_1$ so as to adjust the value of its variable gain, as described in detail with reference to FIG. 2.

The compression modules $18_2, \ldots, 18_N$ are identical to the first compression module $18_1$ previously described and shall not therefore be detailed.

It should be noted that the image sensor 10 schematically represented in FIG. 1 is, for example, a digital camera, a camera, a digital camcorder or even a mobile telecommunication device or data processing device of any sort equipped with such an integrated camera or camcorder.

The compression method for capturing images, the steps of which are illustrated in FIG. 2, can be implemented by the image sensor 10 of FIG. 1. It comprises a first step 100 for the analogue decorrelation of a block of an image captured for the generation of low-frequency coefficients and high-frequency coefficients from the pixels of this block. Using the previous example of sequential coding by blocks of 2×2 pixels via a first-order Haar transform, the processing of an i-nth block in step 100 provides four decorrelation coefficients A(i), B(i), C(i) and D(i).

During a next discrimination step 102, the low-frequency coefficients and high-frequency coefficients originating from the previous analogue decorrelation process are differentiated. In practical terms, in the aforementioned example, the coefficient A(i) is differentiated from the coefficients B(i), C(i) and D(i).

Coefficients B(i), C(i) and D(i) are amplified during a step 104 by the first amplifier of the compression module corresponding to the columns processed, which applies a constant gain G1=4.

Coefficient A(i) is amplified in steps 106 and 108 by the second amplifier of the compression module considered, which applies a variable gain G2(i) for example equal to 1, 2 or 4.

More precisely, in step 106, the value of the gain G2(i) is determined according to its previous value G2(i−1), applied to the low-frequency coefficient A(i−1) of the (i−1)-nth block, and according to the numerical value An(i−1), originating from the analogue/digital converter, of the amplified low-frequency coefficient G2(i−1)×A(i−1). It can also be initialised at the value G2(1)=1 for the first block of pixels processed.

In one particularly simple embodiment of the invention:
if the two most significant bits of the numerical value An(i−1) each have the value 1, this means that An(i−1) is saturated or close to saturation; the value of G2(i) is therefore determined according to the following equation:

$$G2(i) = \text{Max}\left[1; \frac{G2(i-1)}{2}\right],$$

if the two most significant bits of the numerical value An(i−1) each have the value 0, this means that An(i−1) is far from saturation; the value of G2(i) is therefore determined according to the following equation:

$$G2(i)=\text{Min}[4; 2 \times G2(i-1)],$$

otherwise, the value G2(i) is maintained at the value G2(i−1).

More generally, this means that if the numerical value An(i−1) is more than or equal to a first predetermined value, considered as being too close to the saturation value of the analogue/digital converter, the value of the gain G2 is reduced, while remaining more than or equal to a predetermined minimum gain value (in this case, 1); if the numerical value An(i−1) is less than or equal to a second predetermined value, lower than the first value, the value of the gain G2 is increased, while remaining less than or equal to a predetermined maximum gain value (in this case, 4); otherwise, the value of the gain G2 is maintained at its previous value.

The two following obstacles are therefore avoided:
if the value of a coefficient and the gain applied to the latter are too low, the quantisation applied is therefore too coarse and the resulting numerical value is extremely noisy,
if the value of a coefficient and the gain applied to the latter are too high, the quantisation causes saturation and produces artefacts.

In step 108, when the value of gain G2(i) is determined, the coefficient A(i) is amplified by the second amplifier of the compression module corresponding to the columns processed, which applies the gain G2(i).

Following steps 104 and 108, the amplified analogue coefficients G2(i)–A(i), G1×B(i), G1×C(i) and G1×D(i) are digitised by the analogue/digital converter of the compression module considered in step 110.

Finally, in a last step 112, the amplified, digitised coefficients are transmitted by the compression device 18 to the interface 20. The method then resumes at step 100 for processing an (i+1)-nth block of the image.

The method previously described is implemented by the compression device 18 integrated into the imager circuit 22 of the image sensor 10. The flow supported by the physical electronic link 24 is therefore greatly reduced.

The electronic circuit schematically represented in FIG. 3 is one possible implementation of the assembly comprising the analogue decorrelation module $30_i$ and the analogue amplification module $32_i$, $34_i$ of any one of the compression modules $18_i$ of the image sensor 10 of FIG. 1.

This circuit comprises a digital control module $40_i$ and an analogue decorrelation and amplification module $42_i$.

The analogue decorrelation and amplification module $42_i$ comprises a voltage amplification assembly using an operational amplifier $44_i$. This assembly has a first circuit of four identical capacitors C positioned in parallel between an adjustable common-mode voltage Vcm and four respective voltages Va(j), Vb(j), Vc(j) and Vd(j) directly dependant on four pixel values a, b, c and d of a j-nth block of pixels to be processed. The terminal of each capacitor that can be connected to the common-mode voltage can also be connected at the inverting input of the operational amplifier $44_i$. The other terminal of each capacitor that can be connected to its respective voltage Va(j), Vb(j), Vc(j) or Vd(j) can also be connected to the non-inverting input of the operational amplifier $44_i$, the latter being itself connected to the common-mode voltage Vcm. Finally, the capacitors are connected to each other, to the common-mode voltage, to the respective voltages Va(j), Vb(j), Vc(j) and Vd(j) and to the inverting and non-inverting inputs via a set of switches $i_1, \ldots, i_{22}$ controlled by the digital control module $40_i$. This set of switches in particular enables the first circuit to be configured so that the differential input voltage of the operational amplifier is selectively proportional to one of the four expected decorrelation coefficients A(j), B(j), C(j) and D(j) for the j-nth block of pixels. The first circuit therefore fulfils its analogue decorrelation function identified by the reference $30_i$.

The voltage amplification assembly illustrated in FIG. 3 also has a second feedback circuit comprising three respective capacitors C, C and 2C and a short-circuit positioned in parallel between the output of the operational amplifier $44_i$ and its inverting input. One switch $i_{23}$ is positioned in the short-circuit, one switch $i_{24}$ in the branch comprising one of the two capacitors C and one switch $i_{25}$ in the branch comprising the capacitor 2C. By playing on the opening or closing of switches $i_{24}$ and $i_{25}$, the equivalent capacitance Cf of the second feedback circuit can be selectively adjusted between the desired values of C, 2C and 4C. Switches $i_{23}$, $i_{24}$ and $i_{25}$ are controlled by the digital control module $40_i$. The second feedback circuit therefore fulfils its differentiated analogue amplification function identified by the references $32_i$ and $34_i$. More precisely, taking into account the embodiment provided with reference to FIG. 2, in which the gain G1 is fixed at 4 and the gain G2 varies between the three values 1, 2 and 4, a gain of 4 is obtained when the equivalent capacitance Cf is established at C (switches $i_{24}$ and $i_{25}$ open), a gain of 2 is obtained when the equivalent capacitance Cf is established at 2C (switch $i_{24}$ closed and $i_{25}$ open) and a gain of 1 is obtained when the equivalent capacitance Cf is established at 4C (switches $i_{24}$ and $i_{25}$ closed).

The digital control module $40_i$ is designed to control the different operating phases of the analogue decorrelation and amplification module $42_i$ using the control signals $s_1, \ldots, s_{25}$ for switches $i_1, \ldots, i_{25}$ respectively, and according to the numerical value An(j−1), originating from the analogue/digital converter $36_i$, of the amplified low-frequency coefficient of the (j−1)-nth block of pixels.

For the calculation and amplification of the high-frequency coefficients B(j), C(j) and D(j), in a first initialisation phase, the common-mode voltage Vcm is established at an average value in the dynamic range of the applicable voltages at the input of the operational amplifier $44_i$ as these high-frequency coefficients can take both positive or negative values. For example, for a dynamic range of 1.4 V to 3 V, Vcm is fixed at 2.2 V. Switches $i_1$ to $i_8$ are closed and switches $i_9$ to $i_{22}$ are open. Therefore, the four capacitors of the first circuit charge differently according to the values Va(j), Vb(j), Vc(j) and Vd(j): the capacitor connected to the voltage Va(j) accumulates a charge C[Va(j)−Vcm]. The capacitor connected to the voltage Vb(j) accumulates a charge C[Vb(j)−Vcm]. The capacitor connected to the voltage Vc(j) accumulates a charge C[Vc(j)−Vcm] and the capacitor connected to the voltage Vd(j) accumulates a charge C[Vd(j)−Vcm]. Switch $i_{23}$ is closed and switches $i_{24}$ and $i_{25}$ are open so that the capacitance Cf=C of the feedback circuit does not store any charge.

Then, in a second capacitance switching phase, switches $i_1$ to $i_8$ and switch $i_{23}$ are opened to avoid any short-circuits. Switches $i_9$ and $i_{10}$ are closed to connect the first circuit to the differential input of the operational amplifier $44_i$ and, according to the high-frequency coefficient that is being calculated and amplified:

switches $i_{11}$, $i_{12}$, $i_{17}$, $i_{18}$, $i_{19}$ and $i_{20}$ are closed for the coefficient B(j), switches $i_{13}$, $i_{14}$, $i_{17}$, $i_{18}$, $i_{21}$ and $i_{22}$ are closed for the coefficient C(j), switches $i_{13}$, $i_{14}$, $i_{15}$, $i_{16}$, $i_{21}$ and $i_{22}$ are closed for the coefficient D(j).

For the calculation and amplification of the low-frequency coefficient A(j), in the first initialisation phase, the common-mode voltage Vcm is established at a minimum value in the dynamic range of the applicable voltages at the operational amplifier input $44_i$ as this low-frequency coefficient can only take positive values. For example, for a dynamic range of 1.4 V to 3 V, Vcm is fixed at 1.4 V. Switches $i_1$ to $i_8$ are closed and switches $i_9$ to $i_{22}$ are open. Therefore, the four capacitors of the first circuit charge differently according to the values Va(j), Vb(j), Vc(j) and Vd(j): the capacitor connected to the voltage Va(j) accumulates a charge C[Va(j)−Vcm]. The capacitor connected to the voltage Vb(j) accumulates a charge C[Vb(j)−Vcm]. The capacitor connected to the voltage Vc(j) accumulates a charge C[Vc(j)−Vcm] and the capacitor connected to the voltage Vd(j) accumulates a charge C[Vd(j)−Vcm]. Switch $i_{23}$ is closed and switches $i_{24}$ and $i_{25}$ are positioned by the digital module $40_i$ according to the value An(j−1) so that the desired capacitance Cf=C, 2C or 4C of the feedback circuit does not store any charge.

Then, in the second capacitance switching phase, switches $i_1$ to $i_8$ and switch $i_{23}$ are opened to avoid any short-circuits. Switches $i_9$ and $i_{10}$ are closed to connect the first circuit to the differential input of the operational amplifier $44_i$ and, switches $i_{11}$, $i_{12}$, $i_{15}$, $i_{16}$, $i_{19}$ and $i_{20}$ are closed for the calculation and amplification of the coefficient A(j).

It clearly appears than an image sensor such as that previously presented is capable of optimising the processing operation performed by its analogue/digital conversion modules, positioned at the bases of the columns of the pixel array and downstream of an analogue decorrelation operation, by a prior different amplification of the low-frequency and high-frequency coefficients being quantised and originating from the decorrelation operation.

In particular, given that the dynamic range of the high-frequency coefficients is limited, irrelevant of the direction considered in the image and generally less than one quarter of the dynamic range of the low-frequency coefficients (in thermal infrared imaging for example), it is advantageous to set a high gain, for example 4, specifically for these high-frequency coefficients: this therefore reduces the quantisation step of the analogue/digital conversion. Therefore, unlike a large number of existing methods and devices, emphasis is placed on the output of image details: the discrimination of neighbouring pixels with small differences within an image is improved. For a gain of 4, the noise equivalent power is 16 times less. Otherwise, at the equivalent desired image quality, expressed in PSNR (Peak Signal to Noise Ratio) for example, 2 bits can be found on the size of the digital coefficients at the analogue/digital conversion output with such a gain. The resolution of the converters used and their cost can therefore be reduced while keeping a constant level of quality. The consumption rate of the processing and coefficient transfer operations is also reduced.

Given that the low-frequency coefficients however have a high dynamic range but are subject to significant variations within the same image, their variable amplification gain should be fixed according to an a priori estimation of their range, such as that previously presented. The signal to noise ratio is thus optimised. Furthermore, the method proposed is such that the variations in amplification gain for the low-frequency coefficients can subsequently be found simply by repeating the same method upon decoding.

It should also be noted that the invention is not limited to the embodiment described hereinabove.

Indeed, the invention has been illustrated by an example implementing a particularly simple analogue compression operation by Haar wavelets at a single level based on blocks of 2×2 pixels. However, it can also be applied for any analogue compression operation by decorrelation, providing coefficients among which low-frequency coefficients and high-frequency coefficients can be distinguished. Therefore, the criteria used to discriminate the low-frequency and high-frequency coefficients must be adapted according to the compression used. However, in general, it can often be considered that a compression operation by blocks based on blocks of N×N pixels generates a low-frequency coefficient and $N^2-1$ high-frequency coefficients per block.

The invention has also been illustrated with an analogue/digital conversion operation performed at the bases of the columns of the pixel array of an image sensor, however one of ordinary skill in the art will simply realise that this is applicable, even when a single converter is provided at the pixel array output or when, on the other hand, multiple converters are provided in the pixel array, for example at the rate of one converter per block of pixels processed.

Moreover, in the advantageously simple embodiment previously described, the second amplification means (i.e. the second amplifiers) $34_1, \ldots, 34_N$ are designed to determine, for each low-frequency coefficient being amplified, the value of the second variable gain according to the numerical value, originating from the converter, of a single low-frequency coefficient previously amplified, with this numerical value being used as a predictive value. However, this predictive value could also result from several numerical values for several low-frequency coefficients previously amplified, in particular for the low-frequency coefficients of neighbouring blocks and not necessarily located on the same column: the neighborhood of a block can indeed be defined in a relatively free manner. In this case, the predictive value can be obtained via calculating the average, in particular the weighted average, of the numerical values considered.

Finally, thermal infrared imaging sensors have been mentioned several times, however the invention is not limited to the nature of radiations captured by the device implementing the invention. Furthermore, whereas the invention applies to image sensors, it also applies in the same manner to video sensors.

In a general manner, one of ordinary skill in the art will realise that various modifications can be provided to the embodiment described hereinabove, using the information disclosed herein. In the following claims, the terms used must not be interpreted as limiting the claims to the embodiment presented in this description, however must be interpreted to include all equivalents that the claims intend to cover via their formation and the prediction of which is within reach of one of ordinary skill in the art when applying his/her general knowledge to the implementation of the information disclosed herein.

The invention claimed is:

1. A device for compressing an image for an image sensor, comprising:
   a module for analog decorrelation of an image for providing low-frequency coefficients and high-frequency coefficients from the image;
   an analog/digital coefficient converter; and
   a module for a differentiated analog amplification of the low-frequency coefficients and of the high-frequency coefficients, provided by the analog decorrelation module to provide modified coefficients to the converter.

2. A compression device according to claim 1, wherein the analog amplification module comprises:
   first amplification means configured to apply a first predetermined fixed gain to the high-frequency coefficients; and
   second amplification means configured to apply a second variable gain to the low-frequency coefficients and to determine, for each low-frequency coefficient to be amplified, a value of the second variable gain according to an a priori estimation of the magnitude of the low-frequency coefficient.

3. A compression device according to claim 2, wherein the second amplification means is further configured to determine, for each low-frequency coefficient to be amplified, the value of the second variable gain according to at least one numerical value, originating from the analog/digital converter, of at least one low-frequency coefficient previously amplified.

4. A compression device according to claim 1, wherein the image is comprised from separate blocks of pixels and the analog decorrelation module is further configured to transform each block by decomposition into a predetermined two-dimensional base of discrete functions, the set constituted from the low-frequency coefficients comprises a continuous component coefficient of each block and the set constituted from the high-frequency coefficients comprises other coefficients generated by the decorrelation module.

5. A compression device according to claim 4, wherein the image is an array of photosensitive pixels comprised from blocks of 2×2 pixels and the transform is a two-dimensional Haar transform at a single level performed by switched capacitance assemblies positioned at bases of columns of the pixel array.

6. A compression device according to claim 1, wherein the analog decorrelation module is configured to provide low-frequency coefficients that produce an average value of pixels.

7. An image sensor comprising:
   an array of photosensitive pixels capable of capturing an image; and
   a compression device for the image according to claim 1.

8. A compression method for an image sensor, comprising:
   involving an analog decorrelation of an image captured for generating low-frequency coefficients and high-frequency coefficients, from the image;
   involving analog/digital conversion of the coefficients; and
   involving a differentiated analog amplification of the low-frequency coefficients, and of the high-frequency coefficients, to provide modified coefficients in the analogue/digital conversion.

9. A compression method according to claim 8, wherein, for each high-frequency coefficient, a first predetermined fixed gain is applied, and for each low-frequency coefficient, a second variable gain is applied, the value of which is determined by:
   if the numerical value, originating from the analog/digital conversion, of a predetermined low-frequency coefficient previously amplified is higher than a first value, the value of the second variable gain is fixed at the maximum between a predetermined lower limit value and half of the value of the second variable gain applied to the low-frequency coefficient previously amplified;
   if the numerical value, originating from the analog/digital conversion of the low-frequency coefficient previously amplified is lower than a second value lower than the first value, the value of the second variable gain is fixed at the minimum between a predetermined upper limit value and double the value of the second variable gain applied to the low-frequency coefficient previously amplified;
   otherwise, the value of the second variable gain is fixed at the value of the second variable gain applied to the low-frequency coefficient previously amplified.

10. A compression method according to claim 9, wherein the first fixed gain is equal to 4 and the value of the second variable gain applied to each low-frequency coefficient is determined by:
    if first two most significant bits of the binary value, originating from the analog/digital conversion of a predetermined low-frequency coefficient previously amplified are equal to 1, the value of the second variable gain is fixed at the maximum between the value 1 and half of the value of the second variable gain applied to the low-frequency coefficient previously amplified;
    if the first two most significant bits of the binary value, originating from the analog/digital conversion of the low-frequency coefficient previously amplified are equal to 0, the value of the second variable gain is fixed at the minimum between the value 4 and double the value of the second variable gain applied to the low-frequency coefficient previously amplified;
    otherwise, the value of the second variable gain is fixed at the value of the second variable gain applied to the low-frequency coefficient previously amplified.

11. A compression method according to claim 8, wherein the analog decorrelation includes providing low-frequency coefficients that produce an average value of pixels.

\* \* \* \* \*